United States Patent [19]
Dziekan

[11] Patent Number: 5,260,827
[45] Date of Patent: Nov. 9, 1993

[54] GLARE SHIELD

[76] Inventor: Henry J. Dziekan, 16 W 751 89th Pl., Hinsdale, Ill. 60521

[21] Appl. No.: 871,348

[22] Filed: Apr. 21, 1992

[51] Int. Cl.⁵ .................. G02B 5/30; G02B 27/28; F21V 9/14
[52] U.S. Cl. .................... 359/493; 359/500; 359/501; 362/19
[58] Field of Search ............ 359/493, 500, 501; 362/19

[56] References Cited

U.S. PATENT DOCUMENTS

| | | | |
|---|---|---|---|
| H1154 | 3/1993 | Gibson et al. | 362/19 |
| 2,005,426 | 6/1935 | Land | 359/501 |
| 2,018,963 | 10/1935 | Land | 362/19 |
| 2,078,181 | 4/1937 | Land . | |
| 2,152,513 | 3/1939 | West . | |
| 2,263,684 | 11/1941 | Ryan | 359/501 |
| 2,298,059 | 10/1942 | Land | 359/501 |
| 2,313,831 | 3/1943 | Martin | 362/19 |
| 2,494,543 | 1/1950 | Clarke | 362/19 |
| 2,554,864 | 5/1951 | Lloyd | 359/501 |
| 2,624,236 | 1/1953 | Kirkpatrick et al. . | |
| 2,688,900 | 9/1954 | Silverman | 359/501 |
| 2,705,318 | 3/1955 | Hallerberg | 362/19 |
| 3,171,883 | 3/1965 | Jones . | |
| 3,281,965 | 11/1966 | Irwin | 359/501 |
| 3,368,652 | 2/1968 | Klatchko | 359/501 |
| 3,466,129 | 9/1969 | Agatsuma et al. . | |
| 3,473,867 | 10/1969 | Byrnes . | |
| 3,511,211 | 5/1970 | Horne et al. | 362/19 |
| 3,521,940 | 7/1970 | Heckman, Jr. | 359/501 |
| 3,535,805 | 10/1970 | Peiperl . | |
| 3,567,309 | 3/1971 | Jasgur . | |
| 3,711,182 | 1/1973 | Jasgur . | |
| 3,841,730 | 10/1974 | Karelitz | 362/19 |
| 4,697,890 | 10/1987 | Crookston | 359/501 |
| 4,759,615 | 7/1988 | Bainbridge et al. . | |

OTHER PUBLICATIONS

Pp. 1760 and 1762 from 1989 Edition of McMaster Carr cataloge.

Primary Examiner—Martin Lerner

[57] ABSTRACT

A glare shield attachable to multiple optical devices or for hand held use is disclosed including two ring shaped housing members each carrying a polarizing element with one ring member rotatably mounted co-axially inside the other ring member. One of the housing ring members includes a hook and loop fastener for attachment to a ring type magnifier and a twistable, flexible positionable arm having a clamp for attachment to other types of optical devices.

18 Claims, 3 Drawing Sheets

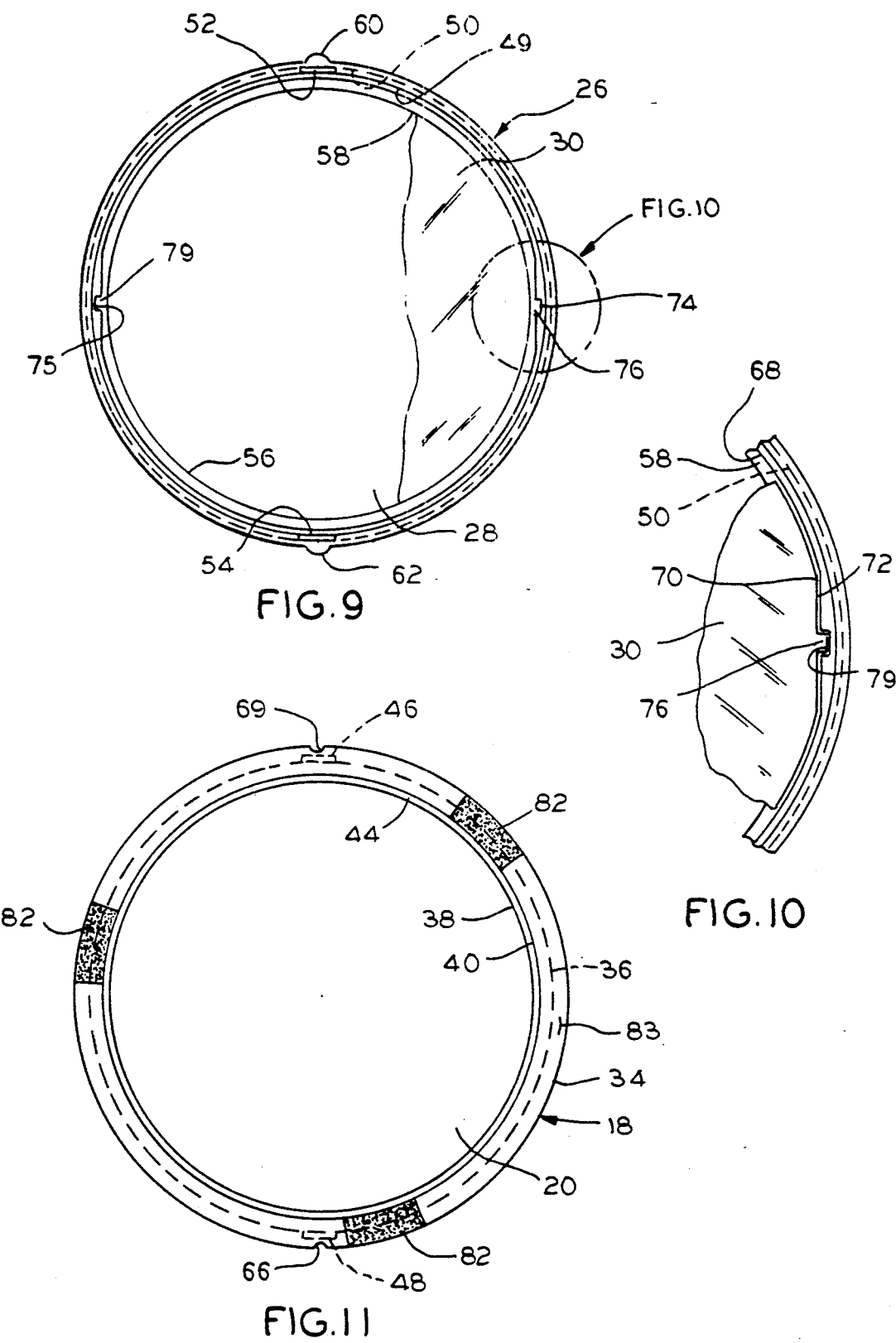

GLARE SHIELD

BACKGROUND OF THE INVENTION

This invention relates to optical filters. More particularly, the invention relates to a device for reducing glare associated with viewing objects in light emitted from a light source. In still greater particularity, the invention relates to a glare reducing device adapted for multi-purpose use including hand held use and for attachment to different types of optical devices including ring-type lighted magnifiers and swing arm-type lamps.

Optical filters and glare reducing devices are known including those utilizing rotatable polarizing elements placed in the light path emitted from a source between the source and a viewer. Such polarizing glare reducing devices typically include a pair of parallel coaxial polarizing elements mounted for relative angular positioning. The principle of glare reduction using polarizing elements is well known and needs no further explanation. Typical and representative of such devices are disclosed in the following U.S. Pat. Nos. uncovered by a search of the prior art.

| | |
|---|---|
| 2,078,181 | 2,152,513 |
| 2,624,236 | 3,171,883 |
| 3,466,129 | 3,473,867 |
| 3,535,805 | 3,567,309 |
| 3,711,182 | 4,757,615 |

While the prior art discloses various glare reducers using polarizing elements, all those uncovered are adapted for attachment to or use with specific optical devices and sources. No glare reducer has been uncovered nor is known to exist which is both usable as a hand held device as well as being adapted for attachment and use with multiple, different types of optical sources such as the above noted ring-type magnifiers and the various assortment of swing arm type lamps available. Ring-type lighted magnifiers are commonly used to view objects and are known to produce glare especially when viewing highly reflective objects and it is highly desirable that a glare reducing shield be made available for removable attachment over the lens of such magnifiers. It is also desirable to provide for modulating the intensity of light emitted from a light source whether or not the source includes a magnifying lens so as to allow a user to view an object by viewing substantially directly into the path of light emitted from the source without straining the user's eyes.

Accordingly, it is the object of the present invention to provide for a glare reducing and light intensity adjustable device adaptable for multi-purpose use for attachment to different types of optical devices and in particular for hand held use and attachment to ring-type lighted magnifiers and modern swing arm-type lamps.

SUMMARY OF THE INVENTION

According to a preferred embodiment of the invention, there is provided a glare shield including a pair of ring shaped housing members attached co-axially together for relative rotation with each ring carrying a linear polarizing element non-rotatably mounted to the respective housing rings over the openings formed by the co-axially mounted rings.

According to an important feature of the invention, one of the ring members is specifically adapted to mount to the housing of a ring-type lighted magnifier over the magnifying lens of the magnifier.

According to another important feature of the invention, one of the rings is provided with a twistable, flexible, positionable arm and clamp providing for attachment to a lamp such as a swing arm-type lamp.

According to the invention, a flange on the end of one of the housing rings carries a hook and loop-type fastener for attachment to a co-operating hook and loop fastener provided on the housing of a ring-type magnifier surrounding the lens element of the magnifier.

According to the preferred embodiment of the invention, one of the housing ring members is provided with an internal annular groove and the second of the housing ring members is provided with a pair of diametrically opposed radial projections received in the groove to axially retain the housing members together and to provide for relative angular rotation of the two housing rings.

According to a still further important feature of the invention, each ring member is provided with an annular relief at one end into which a respective one of two linear polarizing elements is mounted.

According to yet another important feature of the invention, each annular relief which receives the polarizing elements is provided with means for securing the polarizing element for non-rotation within the relief.

According to the preferred embodiment, the means for non-rotatably securing the polarizing elements includes a discontinuity in the circular shape of the relief and complimentary discontinuities in the circular shape of the polarizing elements.

According to another important feature of the invention the means for non-rotatably securing the polarizing elements to their respective rings includes radial slots provided in the walls which form the annular reliefs in the housing members and co-operating radial projections on the peripheries of the polarizing elements received in the slots.

BRIEF DESCRIPTION OF THE DRAWINGS

The invention will be better understood after reading the following Detailed Description of the Preferred Embodiment in conjunction with the drawings of which:

FIG. 9 is an end view of the outer ring of the glare shield housing taken toward an interior end of the ring with a portion of the polarizing element cut away showing details of construction;

FIG. 10 is an enlarged view of a cut-away portion of the housing outer ring circled in FIG. 9 showing details of the mounting and retention of the polarizing element to the ring; and FIG. 11 is an end view of the inner ring member of the glare shield housing taken toward the mounting flange end of the member showing details of construction.

DETAILED DESCRIPTION OF THE PREFERRED EMBODIMENT

Figure 1:
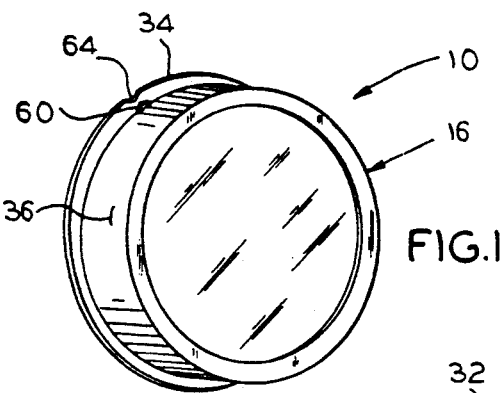
FIG. 1 is a pictorial view of a glare shield according to the invention as viewed toward the viewing end of the shield.
Figure 3:
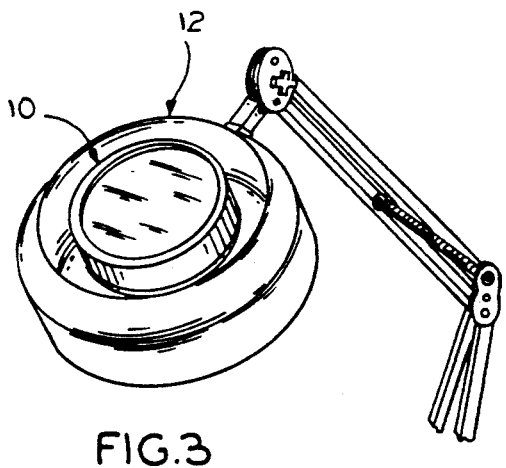
FIG. 3 is a pictorial view of the glare shield according to the invention showing details of attachment to a ring-type lighted magnifier.
Figure 4:
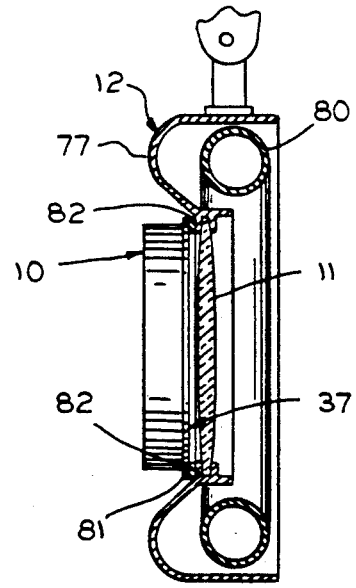
FIG. 4 is a vertical, cross-sectional view though a ring-type magnifier showing further details of attachment of the glare shield according to the invention to such a magnifier.
Figure 5:
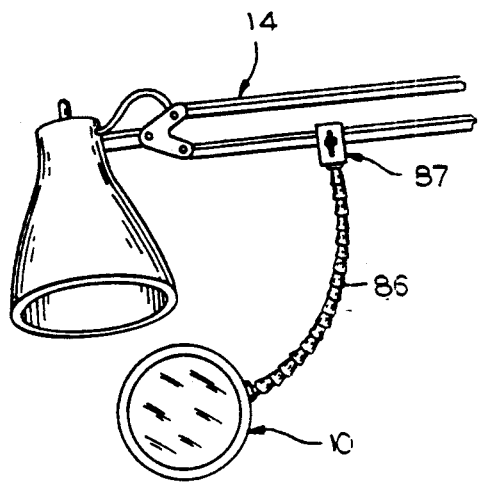
FIG. 5 is a pictorial view of swing arm-type lamp showing a glare shield according to the invention mounted to the lamp.
Figure 6:
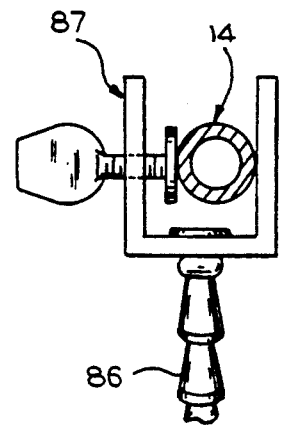
FIG. 6 is an enlarged side elevational view of a clamp portion of a mounting arm of the glare shield in FIG. 5.

Shown in FIG. 1 is a glare shield 10, adapted for hand held use and for use with multiple types of optical devices to reduce glare or to modulate light intensity when a user is viewing an object or otherwise utilizing light emitted from the optical device to illuminate an object. The glare shield 10 in the embodiment of FIG. 1 is suitable for hand held use and, as shown in FIGS. 3 and 4, can be sized and provided with attachment means as described below for temporary attachment and removal over the lens 11 of a ring-type magnifier 12. Further, as shown in FIGS. 5 and 6, the glare shield 10 according to the invention can be provided with attachment means, also described hereinafter, for attachment to various other light sources and optical devices such as the swing arm-type lamp 14 shown in FIG. 5.

The glare shield 10 utilizes the principle of light polarization to reduce glare and to modulate the intensity of light. This principle is well known and needs no further particular explanation other than the device reduces glare by viewing the illuminated object through two parallel coaxial polarizing elements mounted in a housing which are relatively rotatable so as to change the polarization axes of the two elements relative to each other and relative to the direction of vibration of light which is reflected from an object and known to be at least partially polarized due to being reflected. The preferred polarizing elements for use in the construction to be described are linear polarizing-type elements obtainable from the Polaroid Corporation.

Figure 2:
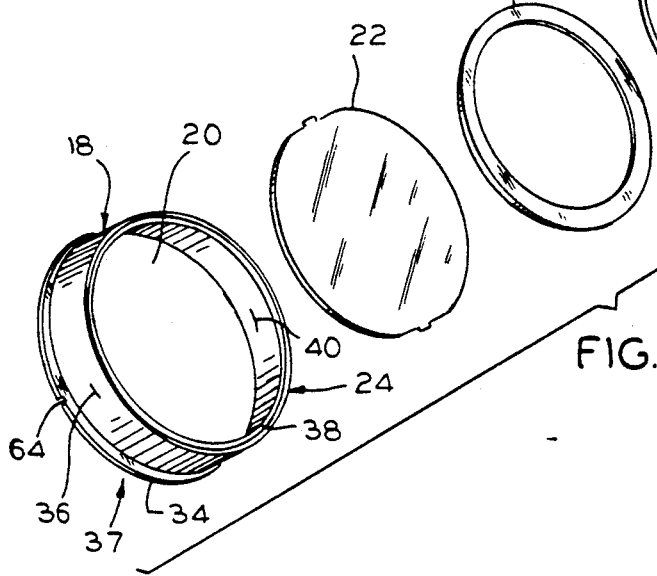
FIG. 2 is an exploded view of the glare shield of FIG. 1 showing details of assembly of the various parts making up the glare shield.

Referring to FIG. 2 and to FIGS. 7-11, the glare shield 10 includes a housing 16 made up of an inner ring-shaped member 18 forming a central opening 20 and to which a first linear polarizing element 22 is non-rotatably mounted across the opening 20 at an inner end 24 of the ring and an outer ring-shaped member 26 rotatably mounted coaxial to the inner ring 18 which also defines an opening 28 across which a second linear polarizing element 30 is non-rotatably mounted at an outer end 31 of the ring 26. A ring spacer 32 is mounted in the housing between the two polarizing elements.

Figure 7:
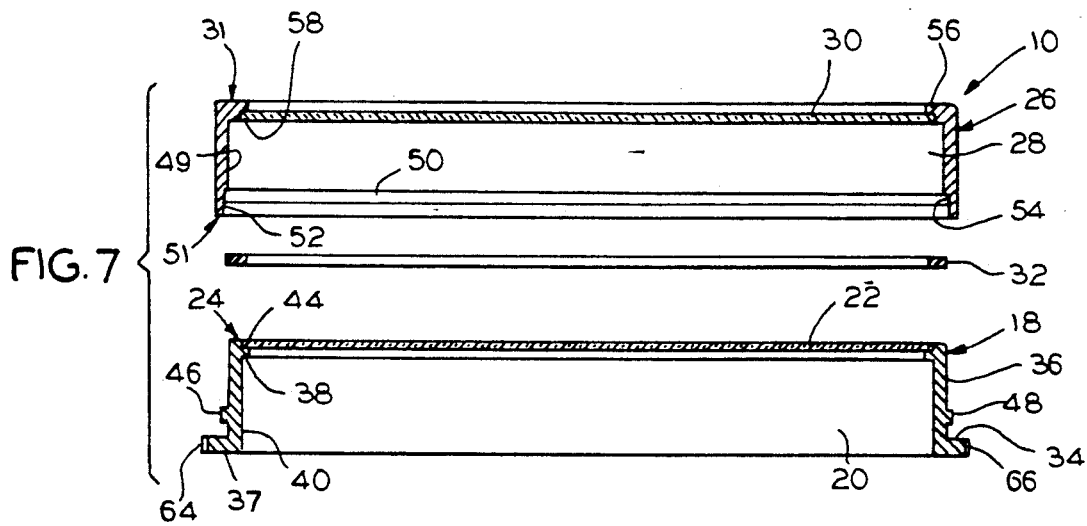
FIG. 7 is an exploded vertical, cross sectional view of a glare shield according to the invention showing details of construction.
Figure 8:
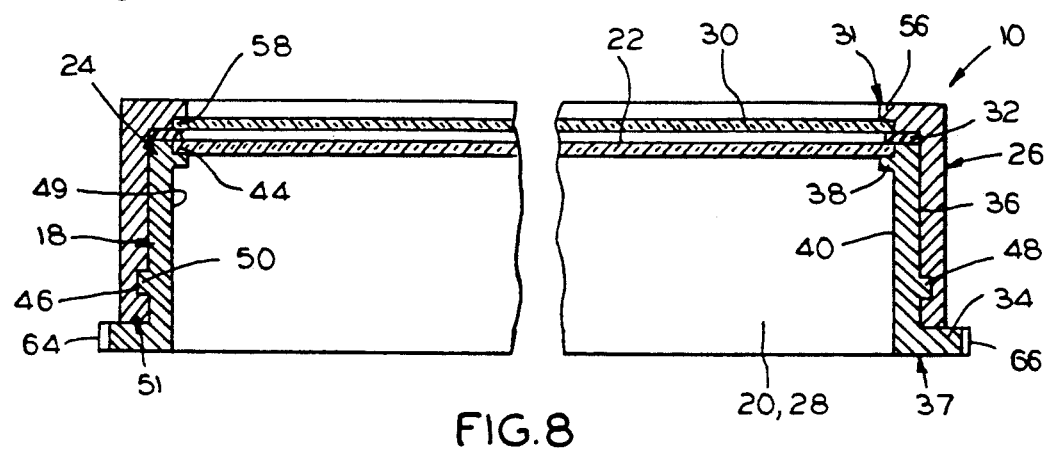
FIG. 8 is an enlarged cross sectional view of a glare shield according to the invention showing further details of construction.

As shown in FIGS. 7-11, the housing inner ring member 18 includes a radially outwardly extending annular flange 34 on its outer surface 36 at its outer end 37 and a radially inwardly extending annular flange 38 on its inner surface 40 at its inner end 24. The radially inwardly directed annular flange 38 forms a shallow axially facing annular relief 44 at the end 24 into which one of the polarizing elements 22 is received. As shown in FIGS. 7 and 8, the housing inner ring 18 is also provided with a pair of tabs 46, 48 or projections at diametrically opposite locations on its outer surface 36 axially spaced from but in proximity to the radially outwardly extending flange 34 of the housing.

Referring to FIGS. 7 and 8, the housing outer ring member 26 has an inner diameter slightly larger than the outer diameter of the housing inner ring 18 to allow the outer ring to slip over and freely rotate on the inner ring. The inner surface 49 of the outer ring is provided with an internal annular groove 50 proximate its one (inner) end 51 and a pair of diametrically opposing internal axial slots 52, 54 opening from the annual groove 50 to the inner end 51 of the ring. The axial slots 52, 54 provide for assembly and disassembly of the two housing rings by aligning the radial tabs 46, 48 on the housing inner ring with the axial slots 52, 54 in the housing outer ring and axially sliding the outer ring co-axially onto the inner ring until the radial tabs 46, 48 align with the annular internal groove 50 in the outer housing ring. By rotating the two housing rings relative to each other, the tabs 46, 48 engage within the groove 50 axially retaining the rings together and providing for coaxial relative rotation of the rings.

The housing outer ring 26 is provided at its opposite (outer) end 31 with a radially inwardly extending annular flange 56 which is internally annularly undercut forming a shallow axially inwardly facing annular relief 58 into which the other of the polarizing elements 30 is received. As shown in FIG. 8, preferably the plastic ring spacer 32 is disposed between the two polarizing elements when the housing rings are assembled.

According to the preferred embodiment, to aid in indexing the two radial tabs 46, 48 on the inner ring with the two axial slots 52, 54 in the outer ring, there is provided index markings in the form of bumps or tabs 60, 62 on the outer surface of the outer ring and small v-notches 64, 66 on the periphery of the flange 34 of the inner ring respectively corresponding to the locations of the slots 52, 54 and tabs 46, 48. By aligning the index tabs and notches, the assembler knows that the tabs and slots are axially aligned and that the housing ring members may be fitted together or dissembled.

As shown in FIGS. 9 and 10, each polarizing element 22, 30 is circular and is received in one of the circular annular reliefs 44, 58 in the respective inner and outer housing rings. Each polarizing element is non-rotatably mounted relative to the housing ring to which it is mounted providing for rotation of the two polarizing elements relative to each other when one of the housing rings is rotated relative to the other which in turn provides for changing of the angular orientation of the polarization axes of the two elements. The non-rotatable mounting of both polarizing elements is identical and accordingly only one mounting pertaining to the housing outer ring will be described with it understood that the mounting of the polarizing element to the inner ring of the housing is identical. Referring to FIGS. 9 and 10, the non-rotatable mounting of the polarizing element, element 30 in FIGS. 9 and 10, is achieved through complimentary discontinuities in the otherwise circular periphery of the polarizing element 30 and wall 68 of the annular relief 58 in which the polarizing element is mounted. As shown best in FIG. 10, one form of anti-rotation mounting includes at least one flat or chordal surface 70 and edge 72 along a portion of the circular wall 68 of the relief and periphery of the polarizing element respectively. In place of, or in addition to, the chordal surface and edge, the wall 68 of the ring forming the relief can be provided with at least one radial slot 74 for receiving a complementary shaped and sized radial tab or projection 76 on the periphery of the polarizing element to prevent rotation of the element in the annual reliefs. Preferably two diametrically opposed tabs 76, 79 and slots 74, 75 are provided as shown in FIG. 9.

As shown in FIGS. 3 and 4, one use of the glare shield is for attachment to a common ring-type lighted magnifier 12 of the type having a ring or generally toroidal shaped housing 77 having a magnifying lens 11 mounted in the central opening of the ring and a light source 80 such as a circular fluorescent light mounted within the housing. This common ring-type magnifier includes an annular surface 81 around the magnifier lens and, according to the preferred embodiment, the one end 37 of the glare shield housing inner ring is adapted to attach to the magnifier co-axially over the lens preferably with a hook and loop-type fastener 82, for example, one or more or a continuous ring of hook and loop material 82 adhesively secured to the outer surface 83 of the radially outwardly extending flange 34 as shown in FIG. 11 which is attachable to a cooperating hook and loop fastener material adhesively secured to the annular surface which is present around the lens 11 of these common ring-type magnifiers as shown in FIG. 4.

Alternatively, the outer diameter of the radially outwardly extending flange 34 on the end 37 of the glare shield housing inner ring can be manufactured specifically sized for frictional fit and retention to a known magnifier housing lens opening diameter with no other fastener means required.

As noted above, the glare shield 10 is also adapted for attachment to other optical devices including, for example, swing arm-type lights 14 as shown in FIG. 5 by the provision of a frictional ball and socket-type arm 86 which is flexible, twistable and adjustable for positioning at any of an infinite number of positions relative to the axis of the light emitted from the light source. The free end of the arm is provided with a clamp such as a C-clamp 87 shown in FIG. 6 for positive but removeable attachment to the lamp as shown for example in FIG. 5.

It can be seen and appreciated that the glare shield according to the invention provides for a multiple use light conditioning device in that it provides for hand held use as well as mounting to multiple different types of optical devices. The device should not be considered limited to use solely with the ring-type magnifiers and swing arm-type lamps disclosed. These applications are representative of preferred uses of the shield however, those skilled in the art can readily appreciate the advantages of the glare shield according to the invention and adapt the glare shield for use with other types of optical devices which other adaptations are to be considered to be within the scope of the appended claims.

What is claimed is:

1. A glare shield, comprising:
   a housing including a first ring-shaped member defining a first opening, a second ring-shaped member defining a second opening, and means for axially retaining and rotatably mounting one of said first and second ring-shaped members co-axially within the other one of said first and second ring-shaped members such that said one of said first and second ring-shaped members is disposed radially inwardly of the other one of said first and second ring-shaped members, said radially inwardly disposed one of said first and second ring-shaped members having an outer peripheral surface and an axially outwardly facing annular relief at one end, and said other one of said first and second ring-shaped members, disposed radially outwardly of said radially inwardly disposed one of said first and second ring-shaped members, having an inner peripheral surface disposed substantially in rotatable peripheral contact with said outer peripheral surface of said radially inwardly disposed one of said first and second ring-shaped members and having a radially inwardly extending flange at one end and an axially inwardly facing annular relief;
   a first polarizing element non-rotatably mounted upon said first ring-shaped member in said axially outwardly facing relief co-axially across said first opening; and
   a second polarizing element non-rotatably mounted upon said second ring-shaped member in said axially inwardly facing relief co-axially across said second opening;
   said means for axially retaining and rotatably mounting said one of said first and second ring-shaped members co-axially within said other one of said first and second ring-shaped members comprising means projecting radially outwardly from said outer peripheral surface of said radially inwardly disposed one of said first and second ring-shaped members, and annular groove means defined within said inner peripheral surface of said other one of said first and second ring-shaped members for receiving said radially outwardly projecting means of said one of said first and second ring-shaped members so as to permit relative annular rotation of said radially inwardly disposed one of said first and second ring-shaped members with respect to said radially outwardly disposed other one of said first and second ring-shaped members.

2. The glare shield as defined in claim 1 including a ring spacer between said first and second polarizing elements.

3. The glare shield as defined in claim 1 wherein each of said inner and outer ring-shaped members include means associated with said reliefs and with said polarizing elements for preventing rotation of said polarizing elements in said reliefs, said means for preventing rotation including complimentary peripheral discontinuities in a circular shape of the reliefs and polarizing elements.

4. The glare shield as defined in claim 3 wherein an annular wall forming a portion of each of said reliefs in each of said inner and outer ring-shaped members includes at least one radially outwardly extending slot and each of said first and second polarizing elements includes at least one complimentary radially outwardly extending projection on its periphery received in said at least one slot in said wall of said relief.

5. The glare shield as defined in claim 4 including a pair of radially outwardly extending slots at diametrically opposite locations in said annular wall of each of said inner and outer ring-shaped members which form said reliefs and a pair of complimentary radially outwardly extending projections at diametrically opposite locations on each of said first and second polarizing elements, each of said projections received in one of said slots.

6. The glare shield as defined in claim 1 further including means for mounting said housing to an optical device with the polarizing elements in the optical axis of light emitted from said optical device.

7. The glare shield as defined in claim 6 including hook and loop fastener means on an external annular end face of one of said ring shaped members for attachment to cooperating hook and loop fastener means attached to an annular surface around a lens of a ring-type magnifier optical device.

8. A glare shield as set forth in claim 1, further comprising:
a pair of axially extending slots defined upon said inner peripheral surface of said other one of said first and second ring-shaped members and connected to said annular groove means of said other one of said first and second ring-shaped members for permitting said at least two projections of said radially inwardly disposed one of said first and second ring-shaped members to be engaged within said annular groove means of said other one of said first and second ring-shaped members.

9. A glare shield as set forth in claim 8, further comprising:
indexing means provided upon said radially inwardly disposed one of said first and second ring-shaped members and upon said radially outwardly disposed other one of said first and second ring-shaped members for cooperative alignment with respect to each other so as to indicate proper alignment of said at least two projections of said radially inwardly disposed one of said first and second ring-shaped members with said axially extending slots of said radially outwardly disposed other one of said first and second ring-shaped members whereby said at least two projections of said radially inwardly disposed one of said first and second ring-shaped members can be properly engaged within said annular groove means of said radially outwardly disposed other one of said first and second ring-shaped members.

10. A glare shield comprising:
a first ring-shaped member defining a first opening, said first ring-shaped member having an annular groove in an internal annular surface proximate one end of said first ring-shaped member and a first radially inwardly directed annular flange at a second end of said first ring-shaped member;
a first polarizing element mounted to said first radially inwardly directed annular flange across said first opening;
a second ring-shaped member having a radially outwardly extending annular flange at one end of said second ring-shaped member, a pair of diametrically opposite radially outwardly extending projections on an outer peripheral surface of said second ring-shaped member proximate said radially outwardly extending annular flange and a second radially inwardly directed annular flange at a second end of said second ring-shaped member;
a second polarizing element mounted to said second radially inwardly directed annular flange across said second opening;
said second ring-shaped member rotatably mounted within said first ring-shaped member with said pair of projections received in said annular groove and said first and second polarizing elements disposed parallel and axially in close proximity.

11. The glare shield as defined in claim 10 wherein an external surface of said radially outwardly extending annular flange on said second ring-shaped member includes a hook and loop fastener.

12. A glare shield comprising:
a first ring-shaped member having an annular groove in an internal annular surface proximate one end of said first ring-shaped member and a first radially inwardly directed annular flange at a second end of said first ring-shaped member;
a first polarizing element mounted to said first radially inwardly directed annular flange across said first opening;
a second ring-shaped member having a radially outwardly extending annular flange at one end of said second ring-shaped member, a pair of diametrically opposite radially outwardly extending projections on an outer peripheral surface of said second ring-shaped member proximate said radially outwardly extending annular flange and a second radially inwardly directed annular flange at a second end of said second ring-shaped member;
a second polarizing element mounted to said second radially inwardly directed annular flange across said second opening;
said second ring-shaped member rotatable mounted within said first ring-shaped member with said pair of projections received in said annular groove and said first and second polarizing elements disposed parallel and axially in close proximity; and
a twistable, bendable positionable arm attached to one of said first and second ring-shaped members, a free end of said arm including clamp means for attachment to an optical device whereby, said polarized elements are positionable at an infinite number of positions relative to an axis of a light path emitted from said optical device.

13. A glare shield, comprising:
a housing including a first ring-shaped member defining a first opening, a second ring-shaped member defining a second opening, and means for axially retaining and rotatably mounting one of said first and second ring-shaped members co-axially within the other one of said first and second ring-shaped members;
a first polarizing element non-rotatably mounted upon said first ring-shaped member co-axially across said first opening;
a second polarizing element non-rotatably mounted upon said second ring-shaped member co-axially across said second opening; and
means for securing said housing with said first and second ring-shaped members and said first and second polarizing elements to an illuminated ring-shaped magnifier.

14. The glare shield as defined in claim 13 including a flexible, twistable, positionable arm extending from said housing having clamp means at a free end of the arm for attachment to said optical device, whereby said housing is infinitely positionable relative to the optical axis of the light emitted from said optical device.

15. A glare shield as set forth in claim 13, wherein:
said ring-shaped magnifier has a substantially circular configuration.

16. A glare shield as set forth in claim 15, wherein:
said ring-shaped magnifier comprises a magnifying lens coaxially disposed with respect to said glare shield housing, and an annular light source surrounding said magnifying lens.

17. A glare shield as set forth in claim 13, wherein:

said means for axially retaining and rotatably mounting said one of said first and second ring-shaped members co-axially within said other one of said first and second ring-shaped members comprises radially outwardly projecting means disposed upon said one of said first and second ring-shaped members, and annular groove means defined within said other one of said first and second ring-shaped members for receiving said radially outwardly projecting means of said one of said first and second ring-shaped members.

18. A glare shield, comprising:

a housing including a first ring-shaped member defining a first opening and having a first flanged portion and a first predetermined axial length, a second ring-shaped member defining a second opening and having a second flanged portion and a second predetermined axial length which is substantially equal to said first predetermined axial length of said first ring-shaped member, and means for axially retaining and rotatably mounting one of said first and second ring-shaped members co-axially within the other one of said first and second ring-shaped members in a nested manner such that a free end portion of said first ring-shaped member encounters said second flanged portion of said second ring-shaped member and a free end portion of said second ring-shaped member encounters said first flanged portion of said first ring-shaped member whereby the axial length of said housing is substantially equal to said predetermined axial lengths of said first and second ring-shaped members when said first and second ring-shaped members are assembled together in said nested manner such that said assembled housing is rendered compact;

a first polarizing element non-rotatably mounted upon said first ring-shaped member co-axially across said first opening; and a second polarizing element non-rotatably mounted upon said second ring-shaped member co-axially across said second opening.

* * * * *